Patented June 30, 1925.

1,543,948

UNITED STATES PATENT OFFICE.

CHARLES C. MOORE, OF SAN FRANCISCO, CALIFORNIA.

PROCESS OF PRODUCING FRUIT CAKES.

No Drawing.  Application filed February 2, 1924. Serial No. 690,307.

*To all whom it may concern:*

Be it known that I, CHARLES C. MOORE, a citizen of the United States, residing in the city and county of San Francisco, California, have invented certain new and useful Improvements in Processes of Producing Fruit Cakes, of which the following is a specification.

The invention relates to processes of producing fruit wafers, or cakes; and it comprises the removal of the seed, comminuting the fruit residue, shaping the comminuted mass into the form of a wafer, or cake, and subjecting the shaped substance to drying conditions wherein there can be no material change in the chemical structure of the fruit sugars present; all as more fully hereinafter set forth and claimed.

There are numerous fruit products that are marketed in a dehydrated form, such as figs, raisins, prunes, etc., which contain a considerable percentage of fruit sugars, such as fructose, levulose, glucose, sucrose, etc.; which fruit sugars are not materially changed, or inverted, in the dehydration of the fresh fruit. Some of these dried fruits, particularly the prune, are commonly recognized as wholesome, nutritious, palatable and of dietary value when eaten as a dried fruit, that is to say, not cooked. When the prune is cooked, there is a material change in the chemical structure of the fruit sugars. For this reason, the prune is more delectable when not cooked.

I have discovered that by comminuting the fleshy substance of the commercially dried prune, and drying the comminuted substance at a temperature of seventy degrees centigrade, there is no material change in the chemical structure of the fruit sugars; that the dried substance has the same color, fruity flavor and desirable properties of the original commercially dried prune; and that the dried substance will keep for months, or indefinitely, without change. If this dried substance be in the form of a wafer, or cake, its advantages as a food product are apparent, such as reducing the size of the fruit product, the convenience in eating it, and no possibility of germination.

In the customary dehydration of prunes, there is, frequently, an injury to some of the fruit, resulting in a grade commonly known as "slabs". While these "slabs" have their full content of fruit sugars, and have the same desirable food values of the perfect dried prune, they are lowered in the market value for obvious reasons, such as appearance and the ease with which molds, or other contamination, find lodgment. If these "slabs" are utilized, before they have become contaminated, for the making of a dried comminuted mass, or cake, as above mentioned, the resultant cake is equal in quality and desirability to a similar cake that is made from the best grade of commercially dried prunes. If small prunes, such as command a low market value, are utilized for making the dried prune cake, the resultant cake is equal in quality and desirability to a similar cake that is made from the best grade of prunes of the same variety.

While my discovery is applicable to the utilization of high grade prunes, it is particularly applicable to the grades of "slabs", cracked prunes, small prunes, etc., as a means of conserving these grades of dried fruit and bringing them into the condition of a desirable food commodity. And, while my discovery is applicable to any fruit product containing a considerable percentage of fruit sugars, I confine myself, in explanation, to the procedure with prunes.

In practice, I find it efficient to dry the comminuted substance, or cake, in vacuo, as, generally known, the drying period is shortened. The drying may be continued until the cake is of any low moisture content desired, or until it is moisture free and a crisp cake that is very delectable. In comminuting the prune meats, I use a machine that shreds the meats from the seeds without cracking the seeds, and removes the seeds. These removed seeds usually have a small amount of the prune meats adhering to them, and this may be recovered by stirring a mass of seed in a small quantity of hot water until the seeds are freed of all meat; the seed removed, and the recovered meat added to the comminuted mass which is then rolled, or pressed, into a sheet of desired thickness, such as one-eighth inch, and the sheet is cut into wafers, or cakes, of desired size. The wafers, or cakes, are introduced into a vacuum drying apparatus where the temperature is maintained at seventy degrees centigrade and the drying continued until the desired per cent of low moisture content is reached; or, until moisture free, requiring from six to eight hours. The higher the vacuum, the shorter is the time required for drying. The wafers, or cakes, are then packed in the usual form of paper carton to prevent loss of crispness through the absorption of moisture from the atmosphere.

Having thus fully described my invention, what I claim as new and desire to secure by Letters Patent of the United States, is:—

1. The process of treating commercially dried prunes which comprises removing the seed and comminuting the meat substance of the prune, shaping the comminuted substance into cakes, and subjecting the cakes to a drying temperature that is below the inversion point of fruit sugars until the cakes are substantially dry.

2. The process of treating commercially dried fruit which comprises comminuting the meat substance of the fruit, shaping the comminuted substance into cakes, and subjecting the cakes to a drying temperature that is below the inversion point of fruit sugars until the cakes are substantially dry.

3. As a new article of manufacture, a crisp prune cake containing the fruit sugars without material change in chemical structure of the fruit sugars as they exist in the commercially dried prune.

4. As a new article of manufacture, a crisp fruit cake containing the fruit sugars without material change in chemical structure of the fruit sugars as they exist in the commercially dried fruit.

In testimony whereof I have hereunto signed my name in the presence of two subscribing witnesses.

CHARLES C. MOORE.

Witnesses:
CHARLES H. WELCH,
MERRITT T. WILLIAMS.